(12) United States Patent
Holbach et al.

(10) Patent No.: US 12,523,304 B1
(45) Date of Patent: Jan. 13, 2026

(54) BUTTERFLY VALVE

(71) Applicant: The Metraflex Company, Chicago, IL (US)

(72) Inventors: Daniel T. Holbach, Kildeer, IL (US); Jackson Kamedulski, Chicago, IL (US); James D. Clauss, Frankfort, IL (US); Jay R. Johnson, Chicago, IL (US); James Reynold Richter, Chicago, IL (US); Devin Rivera, Melrose Park, IL (US)

(73) Assignee: The Metraflex Company, Chicago, IL (US)

( * ) Notice: Subject to any disclaimer, the term of this patent is extended or adjusted under 35 U.S.C. 154(b) by 0 days.

(21) Appl. No.: 18/913,462

(22) Filed: Oct. 11, 2024

(51) Int. Cl.
*F16K 1/22* (2006.01)
*F16K 31/60* (2006.01)
*F16K 35/00* (2006.01)

(52) U.S. Cl.
CPC .............. *F16K 1/221* (2013.01); *F16K 31/60* (2013.01); *F16K 35/00* (2013.01)

(58) Field of Classification Search
CPC ........ F16K 1/221; F16K 31/602; F16K 35/00; F16K 35/025; F16K 35/06; Y10T 137/7256
See application file for complete search history.

(56) References Cited

U.S. PATENT DOCUMENTS

| | | | | |
|---|---|---|---|---|
| 3,329,394 A | * | 7/1967 | Overbaugh | F16K 35/00 251/99 |
| 4,093,178 A | | 6/1978 | Hughes et al. | |
| 5,579,804 A | * | 12/1996 | Roberts | F16K 35/06 70/180 |
| 5,598,724 A | * | 2/1997 | Primeau | F16K 35/06 70/180 |
| 6,959,909 B2 | | 11/2005 | Bancroft et al. | |
| 8,061,683 B2 | * | 11/2011 | Long | F16K 35/025 251/105 |
| 10,962,140 B2 | | 3/2021 | Hunnekuhl et al. | |
| 2014/0060128 A1 | * | 3/2014 | Fuller | F16K 35/10 70/211 |

FOREIGN PATENT DOCUMENTS

| | | |
|---|---|---|
| EP | 0702177 A1 | 3/1996 |
| GB | 2032579 A | 5/1980 |
| GB | 2206183 A | 12/1988 |
| WO | 9001650 A1 | 2/1990 |

\* cited by examiner

*Primary Examiner* — Reinaldo Sanchez-Medina
(74) *Attorney, Agent, or Firm* — Greer, Burns & Crain, Ltd.

(57) ABSTRACT

A butterfly valve with separate adjustment mechanisms. An apparatus comprising a locking plate comprising one or more locking grooves oriented on a first side of the locking plate and a circumferential opening oriented on a second side of the locking plate opposite the first side, a handle extending radially outward from a center of the locking plate in a first direction, the handle comprising a locking element to interface with the locking grooves of the locking plate, and a tab extending radially outward from the center of the locking plate in a second direction opposite the first direction and operably coupled to the handle, the tab comprising an aperture to receive a fastener, the fastener to interface with the circumferential opening of the locking plate.

20 Claims, 10 Drawing Sheets

BUTTERFLY VALVE

FIELD OF THE DISCLOSURE

This disclosure relates generally to fluid control devices and, more particularly, to a butterfly valve.

BACKGROUND

Fluid control devices such as valves are used in piping systems to control an amount of fluid flowing through pipes within the piping system. In general, the valves can operate between an including a fully opened position (e.g., where walls of the valve are parallel to a flow of fluid through the pipe, or where the flow of fluid is unobstructed) and a fully closed position (e.g., where the walls of the valve are perpendicular to the flow of fluid, or where the flow of fluid is stopped).

A butterfly valve is an example of a fluid control device used to control the position of the valve relative to the flow of fluid. Butterfly valves generally include a handle that allows an operator to change a position of the valve without dismantling or interfering with the piping system.

In some piping systems, the precision required in valve positioning is critical to operation of the piping system. Existing fluid control devices, and, more particularly, existing butterfly valves, attempt to allow higher precision in valve positioning by incorporating a pre-determined adjustment mechanism or a non-determined adjustment mechanism. The pre-determined adjustment mechanism sometimes includes a series of grooves evenly spaced apart to lock the handle, and thus the valve. The non-determined mechanism sometimes includes an opening for which to lock the handle at any number of positions.

However, existing systems and apparatuses fail to incorporate both of the pre-determined and non-determined adjustment mechanisms into a device that durable and modular. Existing systems and apparatuses are typically made of a non-metallic, brittle material such as plastic and incorporate all adjustment mechanisms into a single structure, thus making it difficult to provide a durable butterfly valve that is modular to allow independent operation of the pre-determined and the non-determined adjustment mechanisms.

Therefore, there is a need for a butterfly valve that can be adjusted to a set of pre-determined or any number of non-determined positions, while also providing a durable and modular design to reduce failures and provide greater maintenance flexibility by providing separate structures for the pre-determined and non-determined adjustment mechanisms respectively.

SUMMARY OF THE INVENTION

A new butterfly valve has been invented that addresses one or more of the foregoing.

Accordingly, in an aspect of the present invention, the present invention may be generally characterized as providing an apparatus comprising a locking plate comprising one or more locking grooves oriented on a first side of the locking plate and a circumferential opening oriented on a second side of the locking plate opposite the first side, a handle extending radially outward from a center of the locking plate in a first direction, the handle comprising a locking element to interface with the locking grooves of the locking plate, and a tab extending radially outward from the center of the locking plate in a second direction opposite the first direction and operably coupled to the handle, the tab comprising an aperture to receive a fastener, the fastener to interface with the circumferential opening of the locking plate.

In another aspect, the present invention may be characterized, broadly, as providing a valve assembly comprising a valve, a stem, and a valve adjustment apparatus coupled to the valve via the stem, wherein the valve adjustment apparatus comprises a locking plate comprising one or more locking grooves oriented on a first side of the locking plate and a circumferential opening oriented on a second side of the locking plate opposite the first side, a handle extending radially outward from a center of the locking plate in a first direction and operably coupled to the valve via the stem, the handle comprising a locking element to interface with the locking grooves of the locking plate, and a tab extending radially outward from the center of the locking plate in a second direction opposite the first direction and operably coupled to the handle, the tab comprising an aperture to receive a fastener, the fastener to interface with the circumferential opening of the locking plate.

These and other aspects and embodiments of the present invention will be appreciated by those of ordinary skill in the art based upon the following description of the drawings and detailed description of the preferred embodiments.

BRIEF DESCRIPTION OF THE DRAWINGS

The attached drawings will make it possible to understand how the invention can be produced and practiced.

Figure 1:
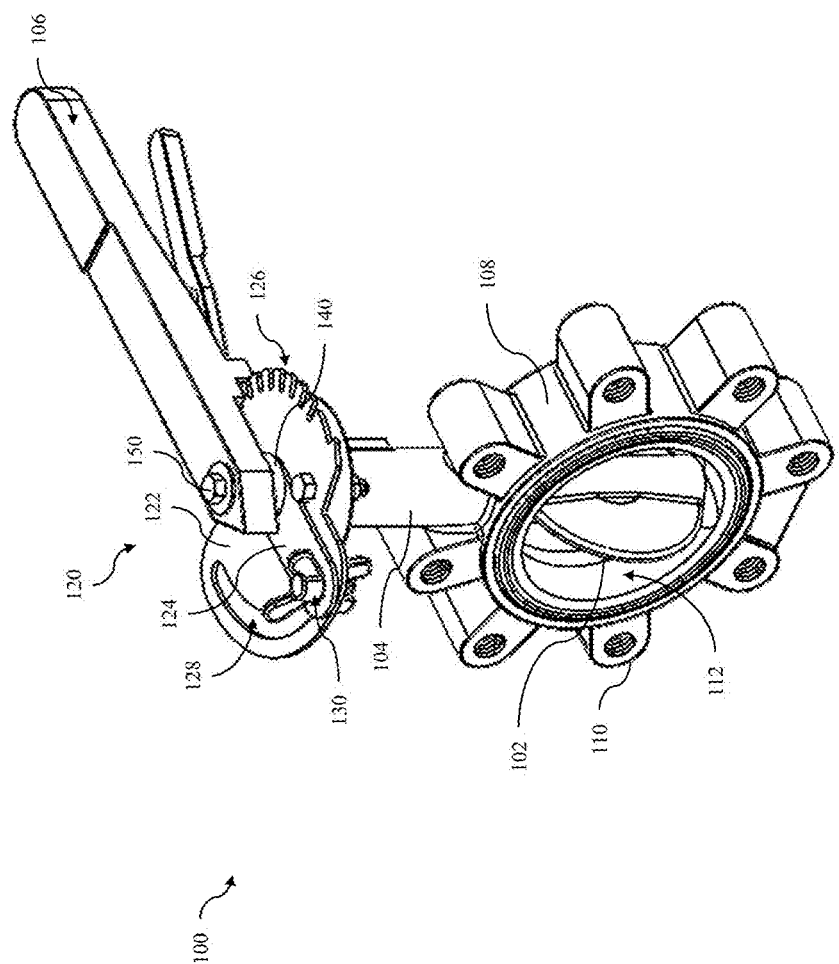
FIG. 1 depicts a butterfly valve according to examples disclosed herein.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

As used herein, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As mentioned above, a new butterfly valve has been invented which includes a handle comprising a locking element to engage with a series of pre-determined locking grooves corresponding to angular values of a valve and a tab to adjust the valve to any number of non-determined angular, the handle and the tab being separate and independent structures.

Accordingly, with reference the attached drawings, one or more embodiments of the present invention will now be described with the understanding that the described embodiments are merely preferred and are not intended to be limiting.

With reference to FIG. 1, a butterfly valve 100 is shown according to examples disclosed herein. Although the examples disclosed herein refer to a butterfly valve, it should be understood that a general valve assembly can be interchangeable used according to the examples.

The butterfly valve 100 includes a valve 102, a stem 104, and a handle 106 operable coupled to the valve 102 via the stem 104. The handle 106 is rotatable about the stem 104 to open and close the valve 102.

The valve 102 is surrounded by a valve housing 108. In some examples, the valve housing 108 includes a series of pipe connectors 110 for coupling the butterfly valve 100 to a pipe (not shown). As shown in the example of FIG. 1, the pipe connectors 110 include a threaded aperture for receiving a bolt or screw to enable coupling of the valve housing 108 to the pipe.

In the examples disclosed herein, the valve 102 operates between a fully open position (which is shown in FIG. 1) and a fully closed position. In the fully open position, fluid passing through the pipe and thus through the valve 102 at an opening 112 is unimpeded such that walls of the valve are parallel to a flow of the fluid through the valve 102 (e.g., the valve 102 is at a 90-degree or perpendicular orientation with respect to the valve housing 108). In the fully closed position, fluid does not pass through the valve 102 (e.g., the opening 112 is closed or sealed shut).

The butterfly valve 100 also includes a valve adjustment apparatus 120. In the examples disclosed herein, the valve adjustment apparatus 120 includes the handle 106, a locking plate 122, and a tab 124. As disclosed above, the handle 106 rotates about the stem 104 to open and close the valve 102. The handle 106 and the tab 124 extend radially outward from the locking plate 122, the handle 106 extending in a first direction and the tab 124 extending in a second direction, opposite the first direction.

The locking plate 122 comprises a series of locking grooves 126 on a first side of the locking plate 122. The handle 106 interfaces with the locking grooves 126, which is described in further detail herein with reference to FIG. 2 and FIGS. 5-10. The locking grooves 126 correspond to pre-determined positions of the valve 102 between and including the fully open and fully closed positions. In some examples, the locking grooves 126 are spaced evenly around a circumference of the locking plate 122. In some such examples, the locking grooves 126 are spaced along a 60-degree circumferential path of the locking plate 122. In particular, assuming a fully closed position is a zero-degree position, the locking grooves 126 can be spaced evenly from the zero-degree fully closed position to a 60-degree open position (e.g., not fully open as defined above).

In other examples, the locking grooves 126 can be spaced evenly about a larger or smaller circumferential path along the circumference of the locking plate 122 (e.g., a 30-degree path, a 45-degree path, a 90-degree path, etc.). Operational factors (e.g., forces expected during operation) and space limitations can be factors that drive a determination of a size of the circumferential path.

The spacing of the locking grooves 126 along the circumferential path can vary based on operational factors as well. In some examples, the spacing of the locking grooves 126 can be every 10-degrees. In other examples, the spacing of the locking grooves 126 can be larger or smaller (e.g., every 5-degrees, every 15-degrees, etc.).

According to the example of FIG. 1, the tab 124 also rotates about the stem 104. In examples disclosed herein, the locking plate 122 further includes a circumferential opening 128 on a second side of the locking plate 122 opposite the first side (e.g., opposite the locking grooves 126). The tab 124 interfaces with the circumferential opening 128 via a fastener 130. The fastener 130 extends through an aperture (not shown) in the tab 124 which aligns with to the circumferential opening 128.

In the examples disclosed herein, the handle 106 and/or the tab 124 is made of a metallic material such as aluminum, stainless steel, titanium, etc., thus providing a relatively strong (e.g., non-brittle) structure for allowing adjustment and securing of the valve 102 while reducing the possibility of failure of the handle 106 and the tab 124. Preventing such failures is important in maintaining functionality of the piping system.

As illustrated in FIG. 1, the circumferential opening 128 is oriented along a circumferential path along the locking plate 122, separate from the circumferential path of the locking grooves 126. In some examples, the circumferential opening 128 spans a 45-degree path along the locking plate 122. However, it should be understood that a larger or smaller path for the circumferential opening 128 can be implemented (e.g., a 30-degree path, a 60-degree path, a 90-degree path, etc.).

The tab 124 opens and closes the valve 102 similar to that of the handle 106. However, the tab 124, via interfacing with the circumferential opening 128, allows adjustment of the valve 102 to an infinite number of non-determined positions. In examples disclosed herein, the tab 124 rotates about the stem 104 to open and close the valve 102. The fastener 130 moves along the circumferential opening 128 with movement of the tab 124. Once a desired position of the valve 102 is achieved, the fastener 130 can be tightened to the locking plate 122 to secure the valve 102 in the achieved position. Such a structure thus allows for adjustment of the valve 102 to any number of non-determined positions. If not secured, the locking grooves 126 may function to catch the handle 106 in the rotationally closest groove to keep the valve open relatively close to the desired position.

In some examples, the tab 124 and the handle 106 move together (e.g., moving the tab 124 will move the handle 106 and vice versa). In other examples, however, the tab 124 and the handle 106 move independently of each other, both still able to adjust the position of the valve 102 (e.g., through the use of gears and/or clutch mechanisms). As such, a modular design in which the tab 124 and the handle 106 can be achieved that allows independent adjustment of the valve 102 according to either a set of pre-determined positions or any number of non-determined positions using separate structural pieces.

In some examples, a spacer 140 is used to separate the tab 124 from the handle 106 on the locking plate 122. The spacer 140 thus creates separation between the tab 124 and the handle 106 during operation. Also as illustrated in FIG. 1, the tab 124 and the handle 106 can be secured to the stem 104 via a coupler 150. In the examples disclosed herein, the coupler 150 is a bolt and washer system. However, it should be understood that any other coupling mechanisms may be used herein such as screws, rivets, etc.

The inclusion of the handle 106 and the tab 124, and all associated mechanisms disclosed herein, allow for the butterfly valve 100 to be adjusted to any number of pre-determined or non-determined positions within the same butterfly valve while utilizing separate structures respectively. Accordingly, a single valve 100 may be used for situations where the pre-determined positions are desirable and where the non-determined positions are desirable.

Figure 2:
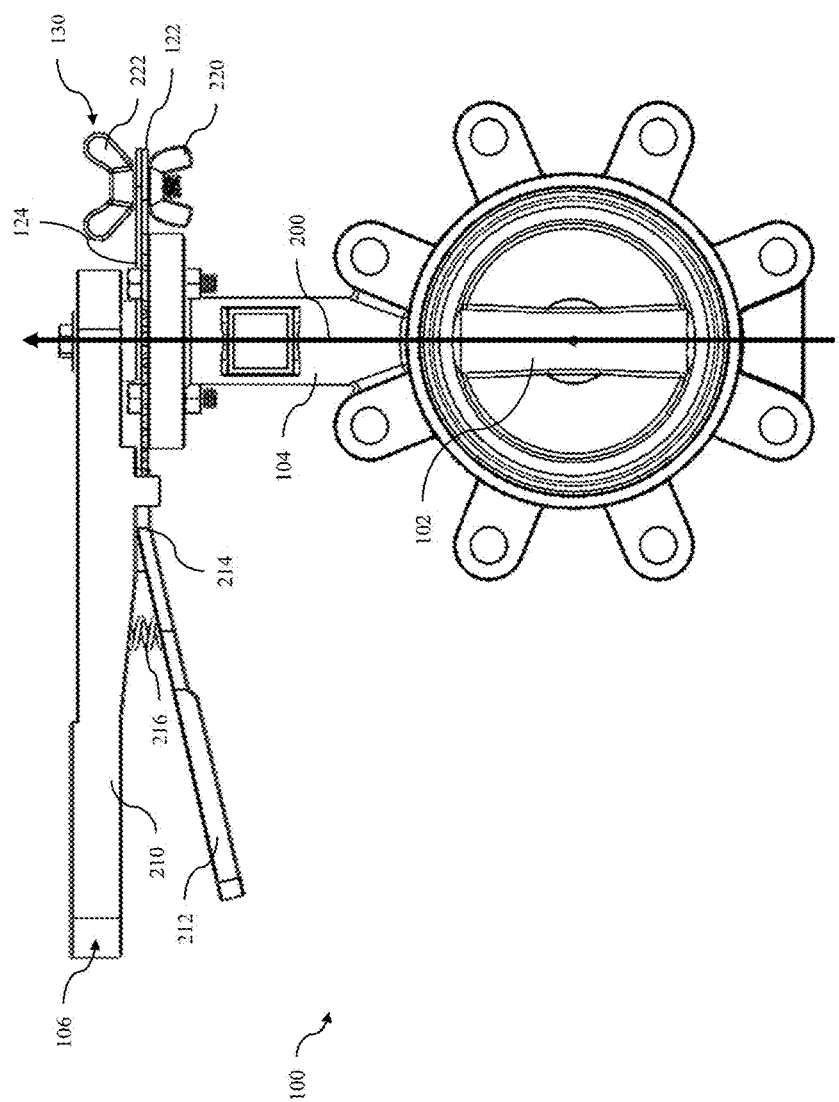
FIG. 2 is a side view of the butterfly valve of FIG. 1.

FIG. 2 is a side view of the butterfly valve 100 of FIG. 1. As disclosed herein, the stem 104 rotates about an axis 200 to open and close the valve 102. The axis 200 as disclosed herein extends from the valve 102 through the stem 104 and the locking plate 122.

In the example of FIG. 2, the handle 106 includes an upper portion 210 and a lower portion 212. The upper portion 210 is configured to rotate about the axis 200 to open and close the valve 102. The lower portion 212 is coupled to the upper portion 210 and thus is also configured to rotate about the axis 200. Additionally, the lower portion 212 is configured to pivot respective to the upper portion 210 to bias a locking element (FIGS. 5-10) of the handle 106 with the locking grooves 126. In the examples disclosed herein, the lower portion 212 pivots about a pivot joint 214 of the handle 106.

In operation, a spring 216 of the handle 106 provides a biasing force to bias the locking element into a locked position relative to the locking grooves 126. In the examples disclosed herein, when the spring 216 is decompressed, the lower portion 212 is locked and thus the valve 102 is held in position. To change the position of the valve, the spring 216 is compressed, by moving the lower portion 212 towards the upper portion 210, to release the lower portion 212 to adjust the handle 106 to a different locking groove 126.

Also as shown in FIG. 2, the fastener 130 includes a thumb screw 220 and a wing nut 222. To adjust the tab 124 and thus the valve 102, the thumb screw 220 is unscrewed from the wing nut 222 to release the tab 124 from the locking plate 122. The tab 124 can then be moved to a new position and thus change the position of the valve 102 according to the examples disclosed herein. The tab 124 and thus the valve 102 is then locked into position again by tightening the thumb screw 220 on the wing nut 222. Although the fastener 130 disclosed herein is a wing nut and thumb screw, it should be understood that alternative fasteners could be used such as nuts and bolts.

Figure 3:
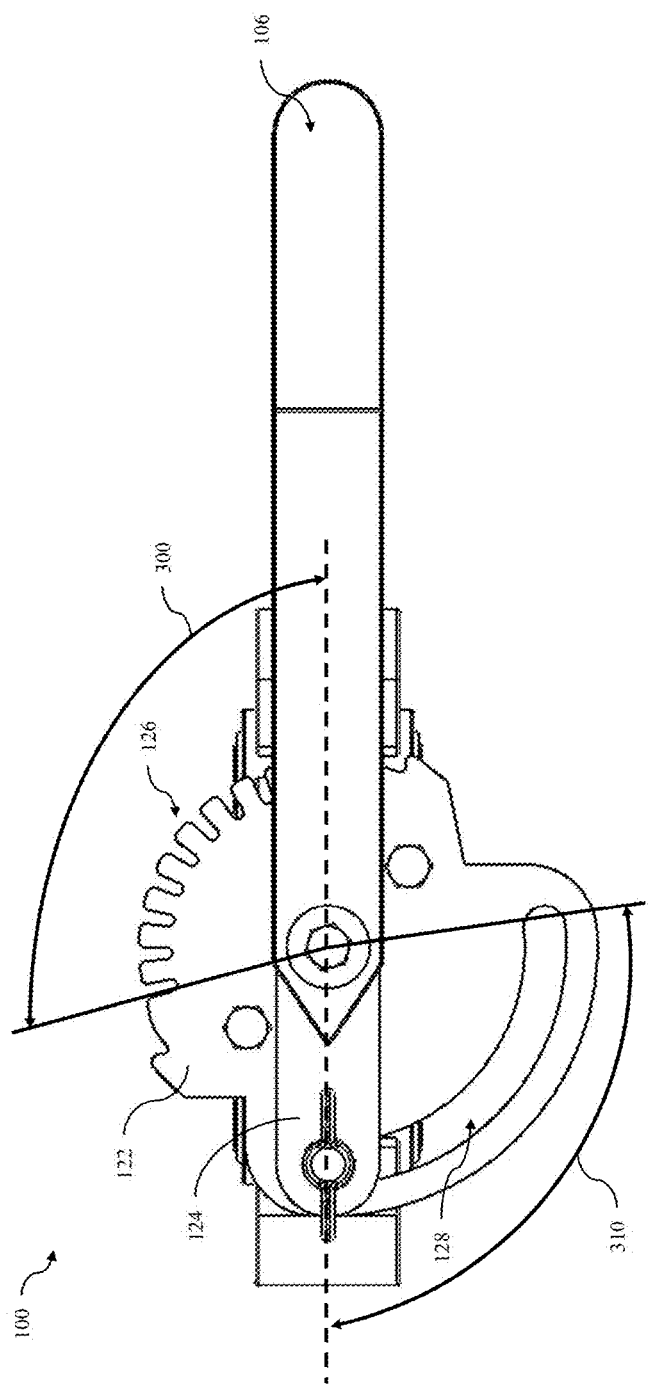
FIG. 3 is a top view of the butterfly valve of FIG. 1.

FIG. 3 is a top view of the butterfly valve 100 of FIG. 1. As disclosed herein, the locking grooves 126 and the circumferential opening 128 can span a variety of different angles along the locking plate 122. As shown in FIG. 3, the locking grooves 126 have a groove span 300 and the circumferential opening 128 has a circumferential opening span 310. In the specific example of FIG. 3, the spans 300, 310 are greater than 90-degrees to allow flexibility in adjustment of the valve 102, not necessarily to mean that the valve 102 can be adjusted to a value of greater than 90-degrees.

Although the example of FIG. 3 shows spans 300, 310 of greater than 90-degrees, the examples disclosed herein are not limited to the examples shown herein. As noted above, the groove span 300 and the circumferential opening span 310 can both span less than, equal to, or greater than 90-degrees.

Figure 4:
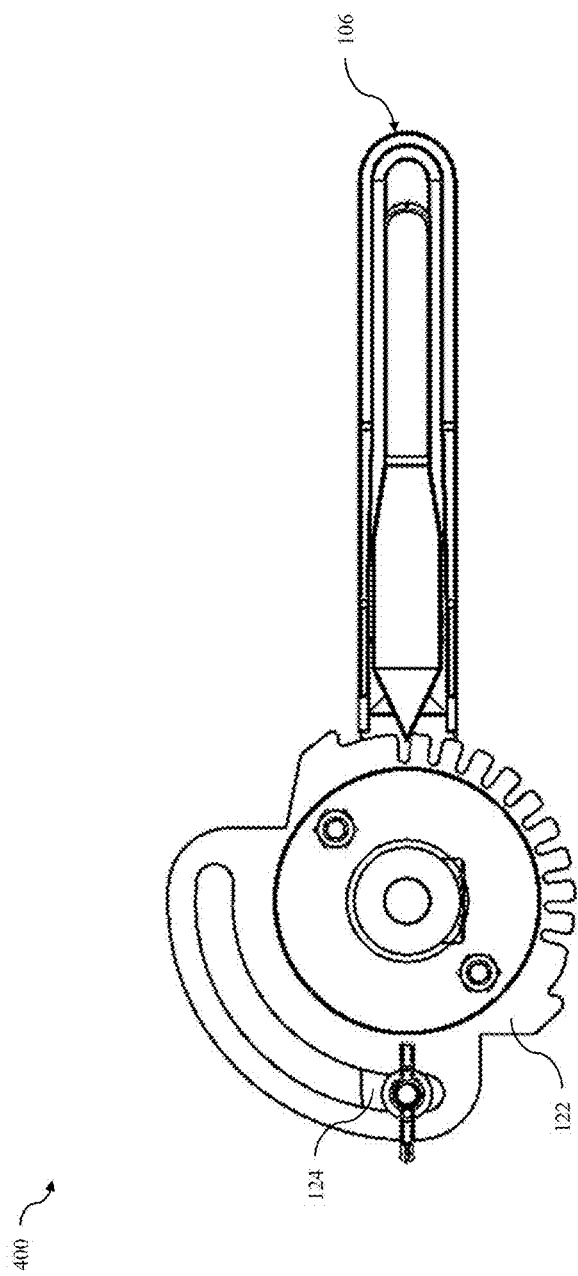
FIG. 4 is a top view of an alternate butterfly valve according to the examples disclosed herein.

FIG. 4 is an alternate butterfly valve 400 according to the examples disclosed herein. In the example of FIG. 4, the tab 124 is oriented underneath the locking plate 122 and the handle 106 and the tab 124 are coupled to the stem 104 underneath the locking plate 122. Such an example is desirable in space-constrained piping systems or to allow more modularity to the piping system. Thus, it should be understood that many different types of configurations can be used based on the examples disclosed herein, and the butterfly valve 100 and the alternate butterfly valve 400 are not limited to the specific examples shown.

Figure 5:
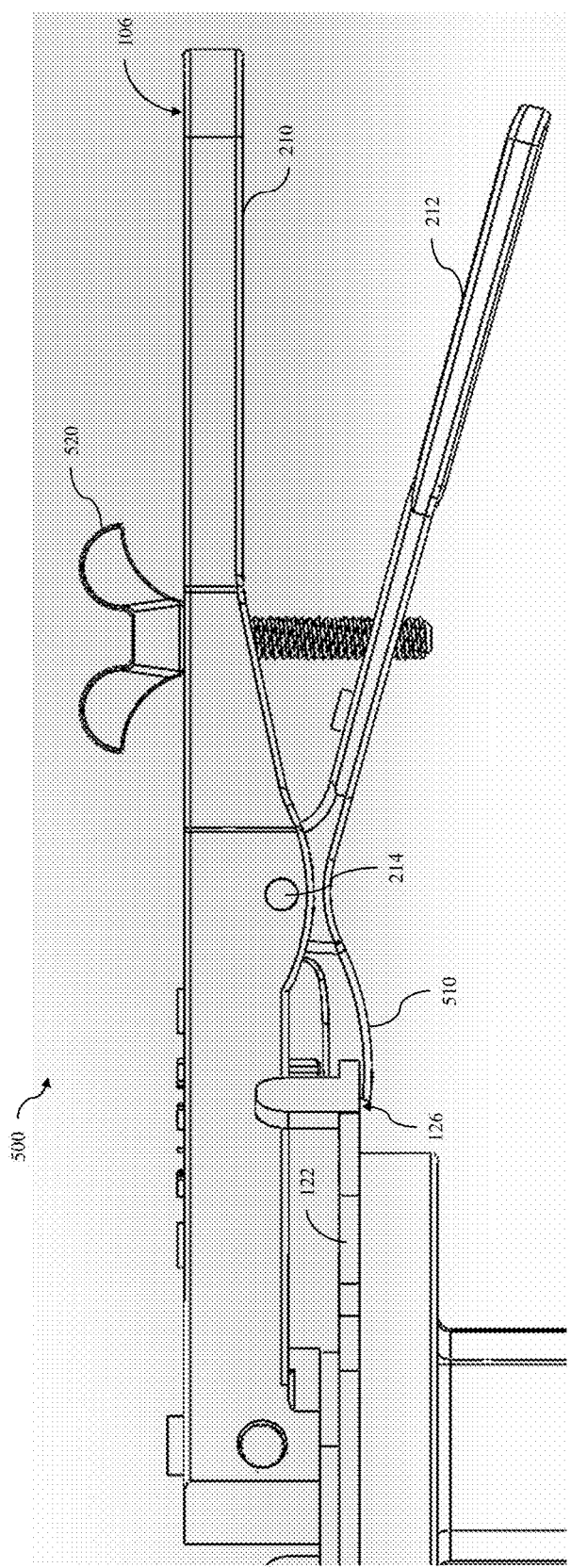
FIG. 5 illustrates a first handle biasing device in a locked configuration.

FIG. 5 illustrates a first handle biasing device 500 in a locked configuration. The first handle biasing device 500 includes a locking element 510 (e.g., the locking element as described in connection with FIG. 2) and a threaded fastener 520. In the example of FIG. 5, the threaded fastener 520 is a thumb screw, however, a bolt or any other threaded fastening device can be interchangeably used.

The locking element 510 is configured to engage with the locking grooves 126 on the locking plate 122 to hold the valve 102 in position. In the example of FIG. 5, the locking element 510 is engaged or locked with the locking grooves 126. The locking element 510 is biased into the locked position via the threaded fastener 520. The threaded fastener 520 extends through the handle 106 from the upper portion 210 through the lower portion 212. The threaded fastener 520 corresponds to a threaded aperture (not shown) in the upper portion 210 and the lower portion 212 to provide a locking force to hold the valve 102 in position.

Figure 6:
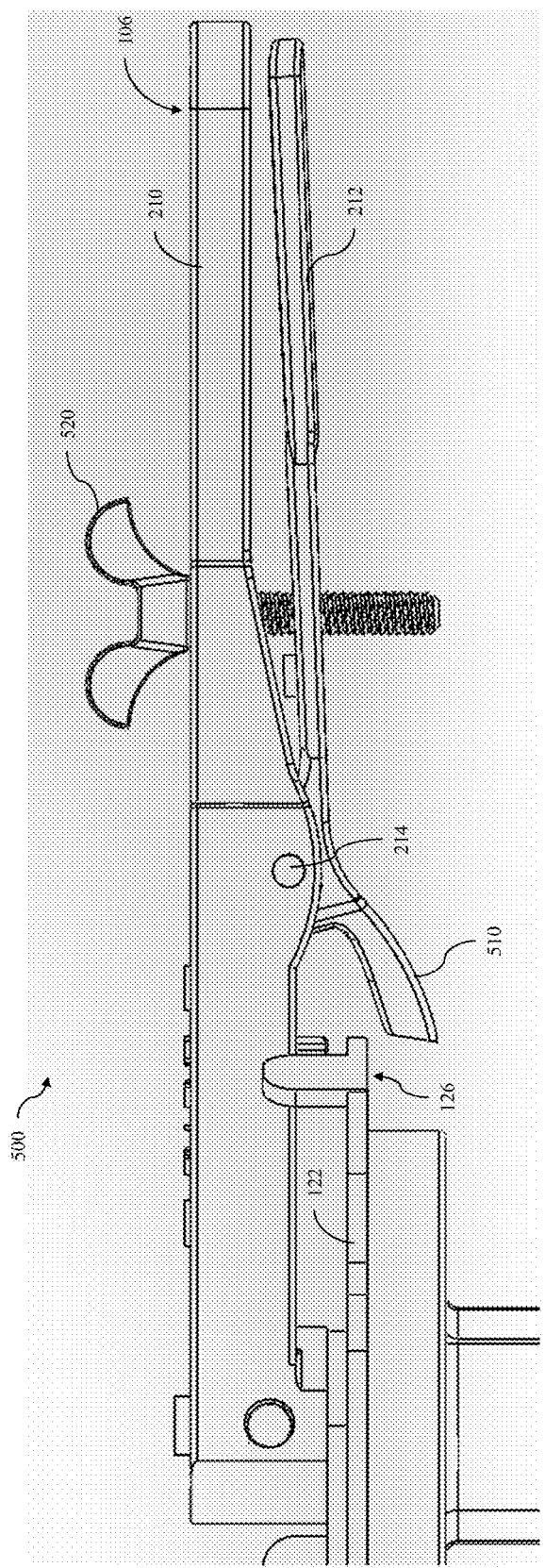
FIG. 6 illustrates the first handle biasing device of FIG. 5 in an unlocked configuration.

FIG. 6 illustrates the first handle biasing device 500 of FIG. 5 in an unlocked configuration. According to the example of FIG. 6, the threaded fastener 520 is rotated to move the lower portion 212 towards the upper portion 210 about the pivot joint 214, thus disengaging or unlocking the locking element 510 from the locking grooves 126. Since the threaded fastener 520 is threaded and extends through the threaded apertures, the biasing force is applied to the lower portion 212 via the threads to keep the lower portion 212 disengaged/unlocked to allow the handle 106 to be adjusted to a different locking groove 126.

Figure 7:
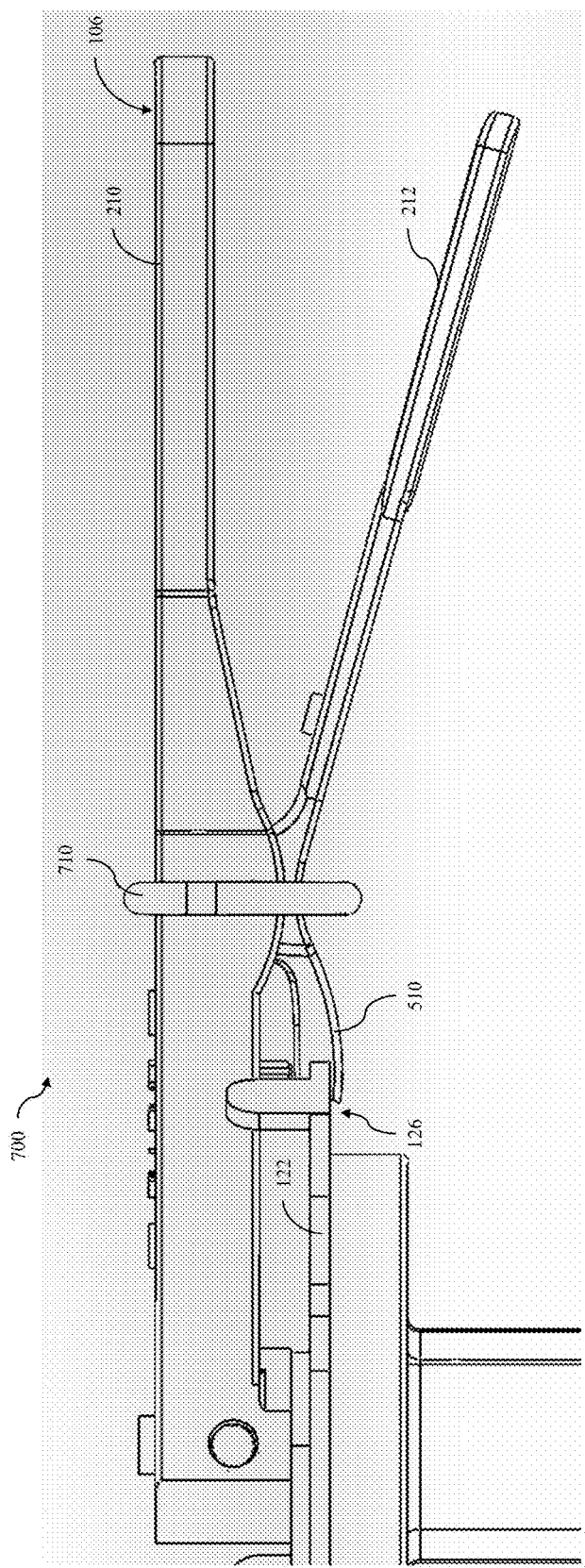
FIG. 7 illustrates a second handle biasing device in a locked configuration.

FIG. 7 illustrates a second handle biasing device 700 in a locked configuration. The second handle biasing device 700 includes the locking element 510 and a latch 710 that surrounds the handle 106. In the example of FIG. 7, the latch 710 is ovular in shape but can be any shape as appropriate to fit around the handle 106.

In the example of FIG. 7, the locking element 510 is biased into the locked position in its natural state (e.g., in a relaxed, uncompressed position). The latch 710 provides no forces on the handle 106 when the second handle biasing device 700 is in the locked or engaged configuration.

Figure 8:
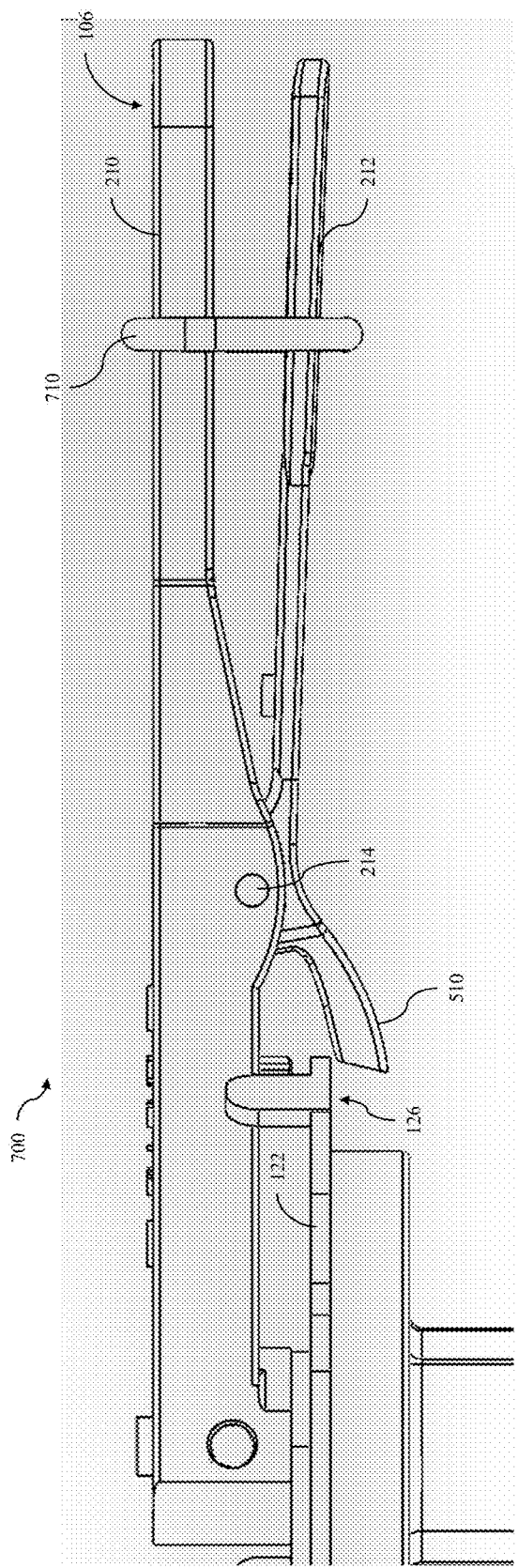
FIG. 8 illustrates the second handle biasing device of FIG. 7 in an unlocked configuration.

FIG. 8 illustrates the second handle biasing device 700 of FIG. 7 in an unlocked configuration. As shown in FIG. 8, the latch 710 is slid towards an end of the handle 106 to pivot the lower portion 212 about the pivot joint 214. The latching element 510 is thus released from the locking grooves 126 to allow the handle 106 to move to a different locking groove 126. The latch 710 provides a means for holding the lower portion 212 in the unlocked/disengaged position while the handle 106 is re-positioned. In the examples disclosed herein, the latch 710 is made of a metallic material such as stainless steel or aluminum, but any other material capable of providing a force according to the examples disclosed herein may be used.

Figure 9:
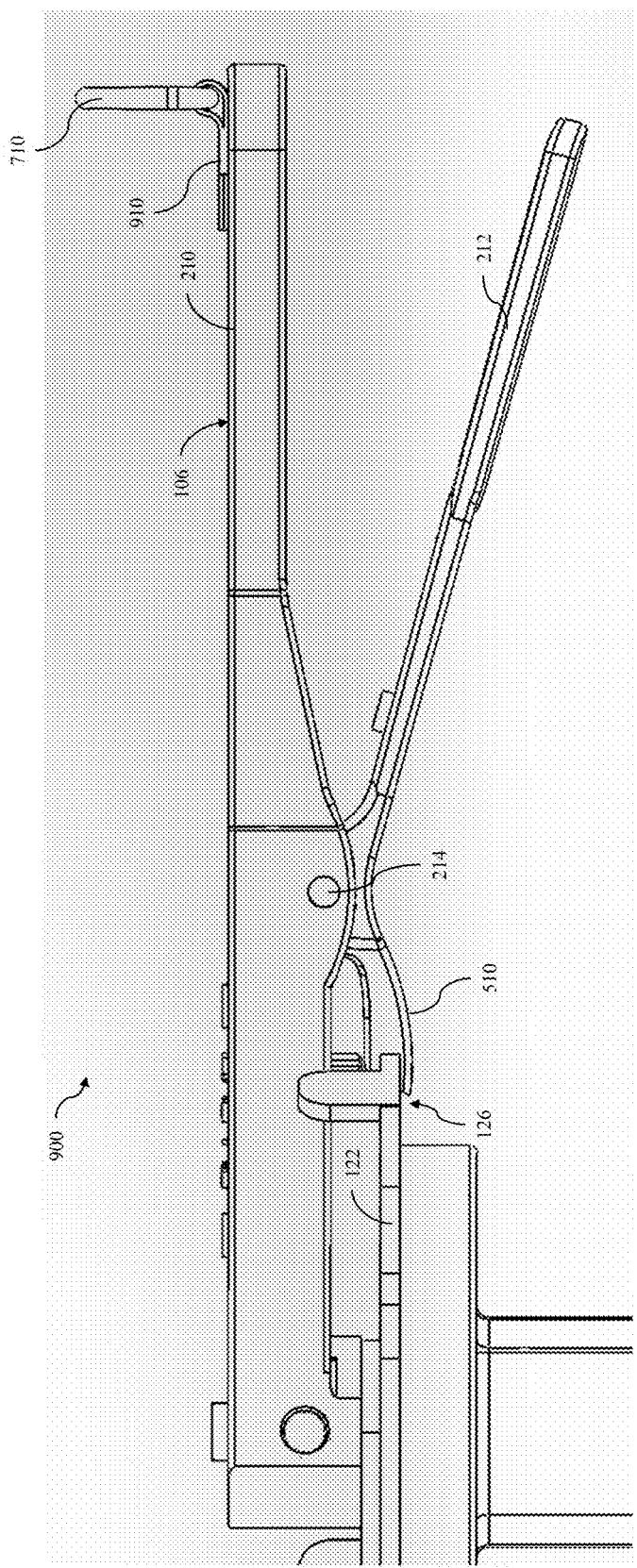
FIG. 9 illustrates a third handle biasing device in a locked configuration.

FIG. 9 illustrates a third handle biasing device 900 in a locked configuration. According to the example of FIG. 9, the latch 710 is disposed at the end of the handle 106 and is secured to the upper portion 210 via a securing device 910. The securing device 910 secures the latch 710 to the upper portion 210 to prevent the latch 710 from being separated from the upper portion 210. The example of FIG. 9 functions similarly to that of the example of FIG. 7.

Figure 10:
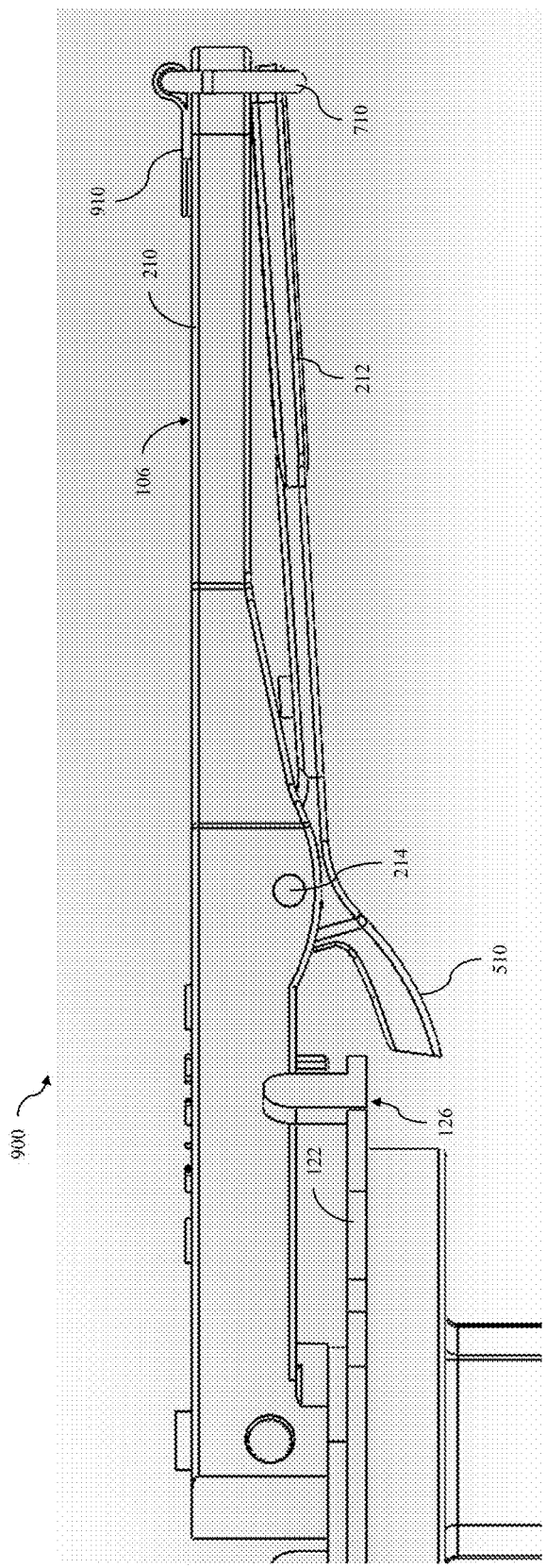
FIG. 10 illustrates the third handle biasing device of FIG. 9 in an unlocked configuration.

FIG. 10 illustrates the third handle biasing device 900 of FIG. 9 in an unlocked configuration. As shown in FIG. 10, the lower portion 212 is rotated about the pivot joint 214 and the latch 710 is rotated about the securing device 910 to surround the upper portion 210 and the lower portion 212. The latching element 510 is thus released from the locking grooves 126 to allow the handle 106 to move to a different locking groove 126. The latch 710, similar to that of the example of FIG. 8, provides a means for holding the lower portion 212 in the unlocked/disengaged position while the handle 106 is re-positioned.

According to the examples disclosed herein, the handle biasing devices 500, 700, 900 are also used to secure the lower portion 212 to the upper portion 210 indefinitely. Locking the lower portion 212 in such a manner allows for adjusting the tab 124 to be adjusted to a non-determined position free from obstructing or interfacing with the locking grooves 126. Such a configuration may be desired where the locking grooves 126 do not provide a desired position of the valve 102.

It should be noted that although the examples disclosed herein provide exemplary embodiments for the butterfly valve 100, 400, alternate designs, materials, and orientations may be used while still falling within the examples disclosed herein.

From the foregoing, it will be appreciated that example systems, apparatus, and articles of manufacture have been disclosed that provide a butterfly valve to adjust a valve to any number of pre-determined or non-determined positions using structurally independent components.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. An apparatus comprising:
   a locking plate comprising:
      one or more locking grooves oriented on a first side of the locking plate; and
      a circumferential opening oriented on a second side of the locking plate opposite the first side;
   a handle extending radially outward from a center of the locking plate in a first direction, the handle comprising:
      a locking element to interface with the locking grooves of the locking plate; and
   a tab extending radially outward from the center of the locking plate in a second direction opposite the first direction and operably coupled to the handle, the tab comprising:
      an aperture to receive a fastener, the fastener to interface with the circumferential opening of the locking plate.

2. The apparatus of claim 1, wherein the one or more locking grooves are evenly spaced along a 60-degree circumferential path of the locking plate.

3. The apparatus of claim 1, wherein the circumferential opening is oriented along a 45-degree circumferential path of the locking plate.

4. The apparatus of claim 1, wherein the handle is operably connected to a valve, the valve movable between a fully closed position and a fully opened position based on a position of the handle relative to the locking plate.

5. The apparatus of claim 4, wherein the one or more locking grooves correspond to one or more pre-determined positions of the valve between and including the fully closed position and the fully opened position.

6. The apparatus of claim 4, wherein the circumferential opening corresponds to a non-determined position of the valve between and including the fully closed position and the fully opened position.

7. The apparatus of claim 6, wherein the fastener is configured to lock the tab in the circumferential opening at the non-determined position.

8. The apparatus of claim 1, wherein the fastener comprises a thumb screw and a wing nut.

9. The apparatus of claim 4, wherein the handle further comprises: an upper portion configured to rotate about an axis to open and close the valve; and a lower portion configured to pivot respective to the upper portion to engage and disengage the locking element with one of the one or more locking grooves.

10. The apparatus of claim 9, wherein the handle further includes a pivot joint joining the upper portion and the lower portion, wherein lower portion pivots respective to the upper portion about the pivot joint.

11. The apparatus of claim 10, wherein the handle further comprises a spring to bias the locking element into a locked position.

12. The apparatus of claim 10, further comprising a threaded fastener extending through the upper portion and the lower portion of the handle to maintain a position of the lower portion of the handle.

13. The apparatus of claim 10, further comprising a latch configured to maintain a position of the lower portion of the handle.

14. The apparatus of claim 10, wherein the latching member is attached to an end of the handle.

15. A valve assembly comprising:
a valve;
a stem; and
a valve adjustment apparatus coupled to the valve via the stem, wherein the valve adjustment apparatus comprises:
a locking plate comprising:
one or more locking grooves oriented on a first side of the locking plate; and
a circumferential opening oriented on a second side of the locking plate opposite the first side;
a handle extending radially outward from a center of the locking plate in a first direction and operably coupled to the valve via the stem, the handle comprising:
a locking element to interface with the locking grooves of the locking plate; and
a tab extending radially outward from the center of the locking plate in a second direction opposite the first direction and operably coupled to the handle, the tab comprising:
an aperture to receive a fastener, the fastener to interface with the circumferential opening of the locking plate.

16. The valve assembly of claim 15, wherein the stem is rotatable about an axis, the handle to rotate the stem about the axis to move the valve between and including a fully closed position and a fully opened position.

17. The valve assembly of claim 16, wherein the one or more locking grooves correspond to one or more pre-determined positions of the valve between and including the fully closed position and the fully opened position.

18. The valve assembly of claim 16, wherein the circumferential opening corresponds to a non-determined position of the valve between and including the fully closed position and the fully opened position.

19. The valve assembly of claim 18, wherein the fastener is configured to lock the tab in the circumferential opening at the non-determined position.

20. The valve assembly of claim 16, wherein the handle further comprises:
an upper portion configured to rotate about the axis to open and close the valve;
a lower portion configured to pivot respective to the upper portion to engage the locking element with one of the one or more locking grooves; and
a pivot joint joining the upper portion and the lower portion, the lower portion to pivot respective to the upper portion about the pivot joint.

* * * * *